US012298692B2

(12) United States Patent
Saeki

(10) Patent No.: US 12,298,692 B2
(45) Date of Patent: May 13, 2025

(54) FIXING DEVICE

(71) Applicant: Toshiba Tec Kabushiki Kaisha, Tokyo (JP)

(72) Inventor: Ryota Saeki, Sunto Shizuoka (JP)

(73) Assignee: TOSHIBA TEC KABUSHIKI KAISHA, Tokyo (JP)

(*) Notice: Subject to any disclaimer, the term of this patent is extended or adjusted under 35 U.S.C. 154(b) by 0 days.

(21) Appl. No.: 18/366,465

(22) Filed: Aug. 7, 2023

(65) Prior Publication Data

US 2025/0053123 A1 Feb. 13, 2025

(51) Int. Cl.
*G03G 15/20* (2006.01)

(52) U.S. Cl.
CPC . *G03G 15/2053* (2013.01); *G03G 2215/2035* (2013.01)

(58) Field of Classification Search
CPC ........... G03G 15/2017; G03G 15/2053; G03G 2215/2003
See application file for complete search history.

(56) References Cited

U.S. PATENT DOCUMENTS

2007/0182798 A1* 8/2007 Makihira ............. H05B 3/0095 347/102
2019/0286027 A1 9/2019 Someya et al.
2019/0286028 A1* 9/2019 Furuichi ............ G03G 15/2053
2020/0103796 A1 4/2020 Furuichi et al.
2021/0072680 A1* 3/2021 Yoshida ............. G03G 15/5004
2021/0405558 A1 12/2021 Yasukawa et al.

FOREIGN PATENT DOCUMENTS

JP H10-247027 A 9/1998
JP 2000-010435 A 1/2000
JP 2008-152957 A 7/2008

* cited by examiner

*Primary Examiner* — Thomas S Giampaolo, II
(74) *Attorney, Agent, or Firm* — FOLEY & LARDNER LLP

(57) ABSTRACT

A fixing device including a tubular body, a heater, and a heat transfer member. The heater is positioned on an inner side of a tubular body and includes a substrate that supports a heat generating body. The substrate includes a first region. A first area in a first position on an inner side of the first region is smaller than the first area in a second position present on an outer side of the first region. The heat transfer member includes a second region. A second area in a third position present on an inner side of the second region is larger than the second area in a fourth position on an outer side of the second region. At least a part of the second region overlaps at least a part of the first region in a first direction.

20 Claims, 9 Drawing Sheets

FIXING DEVICE

FIELD

Embodiments described herein relate generally to a fixing device.

BACKGROUND

An image forming apparatus forms an image on a sheet. The image forming apparatus includes a fixing device. The fixing device heats and pressurizes a toner image on the sheet and fixes the toner image on the sheet. There is a need for a fixing device that can suppress deterioration in the quality of an image formed on a sheet.

DETAILED DESCRIPTION

According to one embodiment, a fixing device includes a tubular body, a heater unit (e.g., a heater, etc.), and a heat transfer member. The heater is present on an inner side of the tubular body and includes a substrate that supports a heat generating body. An axial direction of the tubular body is represented as a first direction. The substrate includes a first region in a part in the first direction. An area of a cross section orthogonal to the first direction of the substrate is represented as a first area. The first area in a first position present on an inner side of the first region is smaller than the first area in a second position present on an outer side of the first region. The heat transfer member is in contact with the heater unit and includes a second region in a part in the first direction. An area of a cross section orthogonal to the first direction is represented as a second area. The second area in a third position present on an inner side of the second region is larger than the second area in a fourth position present on an outer side of the second region. At least a part of the second region overlaps at least a part of the first region in the first direction.

The fixing device in the embodiment is explained below with reference to the drawings.

Figure 1:
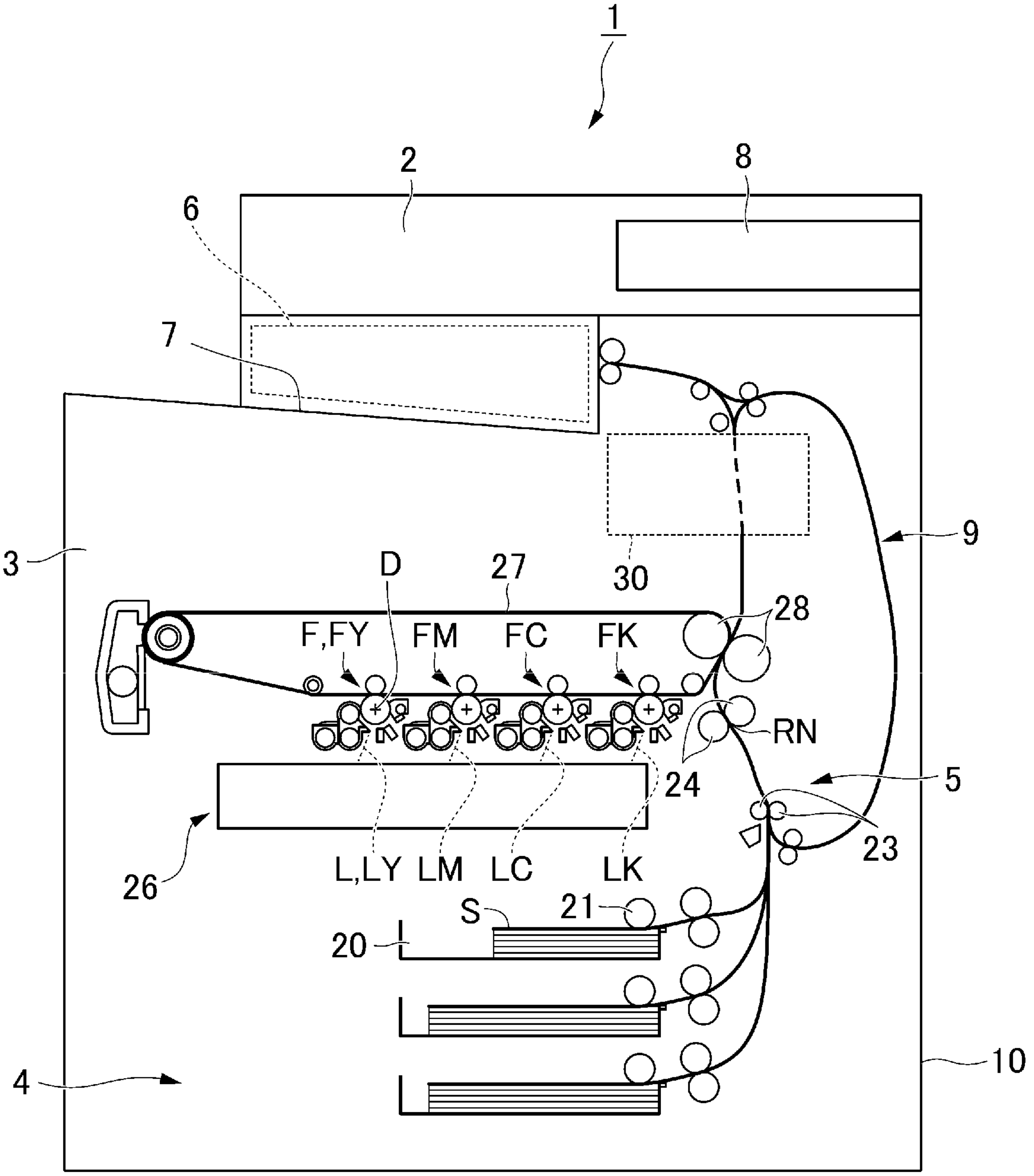
FIG. 1 is a schematic configuration diagram of an image forming apparatus.

FIG. 1 is a schematic configuration diagram of an image forming apparatus. For example, an image forming apparatus 1 is disposed (e.g., positioned, etc.) in a workplace such as an office. The image forming apparatus 1 performs processing for forming an image on a sheet S. The sheet S may be paper. The image forming apparatus 1 includes a housing 10, a scanner section 2, an image forming unit (e.g., an image former, etc.) 3, a sheet supply section 4, a conveying section 5, a reversing unit (e.g., a reverser, etc.) 9, a tray 7, a control panel 8, and a control section 6.

The housing 10 forms the exterior of the image forming apparatus 1.

The scanner section 2 reads image information of a copy target object based on brightness and darkness of light and generates an image signal. The scanner section 2 outputs the generated image signal to the image former 3.

The image former 3 forms a toner image based on an image signal received from the scanner section 2 or the outside. The toner image is an image formed by toner or other materials. The image former 3 transfers the toner image onto the surface of the sheet S. The image former 3 heats and pressurizes the toner image on the surface of the sheet S and fixes the toner image on the sheet S.

The sheet supply section 4 supplies sheets S to the conveying section 5 one by one to be timed to coincide with the formation of the toner image by the image forming unit 3. The sheet supply section 4 includes a sheet storing section 20 and a pickup roller 21.

The sheet storing section 20 stores the sheets S of a predetermined size and a predetermined type.

The pickup roller 21 picks up the sheets S from the sheet storing section 20 one by one. The pickup roller 21 supplies the picked-up sheet S to the conveying section 5.

The conveying section 5 conveys the sheet S supplied from the sheet supply section 4 to the image former 3. The conveying section 5 includes a conveying roller 23 and a registration roller 24.

The conveying roller 23 conveys the sheet S supplied from the pickup roller 21 to the registration roller 24. The conveying roller 23 strikes the leading end in a conveying direction of the sheet S against a nip RN of the registration roller 24.

The registration roller 24 bends the sheet S in the nip RN to thereby align the position of the leading end of the sheet S in the conveying direction. The registration roller 24 conveys the sheet S according to timing when the image former 3 transfers the toner image onto the sheet S.

The image former 3 is explained.

The image former 3 includes a plurality of image forming sections F, a laser scanner 26, an intermediate transfer belt 27, a transfer section 28, and a fixing device (e.g., a fixer, etc.) 30.

The image forming sections F include photoconductive drums D. The image forming sections F form toner images corresponding to image signals on the photoconductive drums D. A plurality of image forming sections FY, FM, FC, and FK respectively form toner images by toners of yellow, magenta, cyan, and black.

Chargers charge the surfaces of the photoconductive drums D. Developing devices store developers including toners of yellow, magenta, cyan, and black. The developing devices develop electrostatic latent images on the photoconductive drums D in order to form toner images of the colors on the photoconductive drums D.

The laser scanner 26 scans the charged photoconductive drums D with laser light L to expose the photoconductive drums D. The laser scanner 26 exposes the photoconductive drums D with separate laser lights LY, LM, LC, and LK in order to form electrostatic latent images on the photoconductive drums D of the image forming sections FY, FM, FC, and FK for the colors.

The toner images on the surfaces of the photoconductive drums D are primarily transferred onto the intermediate transfer belt 27.

The transfer section 28 transfers the toner images primarily transferred on the intermediate transfer belt 27 onto the surface of the sheet S in a secondary transfer position.

The fixing device 30 heats and pressurizes the toner images transferred onto the sheet S and fixes the toner images on the sheet S.

The reversing unit 9 reverses the sheet S in order to form an image on the rear surface of the sheet S. The reversing unit 9 reverses, with a switchback, the front and the rear of the sheet S discharged from the fixing device 30. The reversing unit 9 conveys the reversed sheet S toward the registration roller 24.

The sheet S discharged with an image formed thereon is placed on the tray 7.

The control panel 8 is a part of an input section to which an operator inputs information for operating the image forming apparatus 1. The control panel 8 includes a touch panel and various hard keys.

The control section 6 controls operations of the sections of the image forming apparatus 1.

The fixing device 30 is explained in detail.

Figure 2:
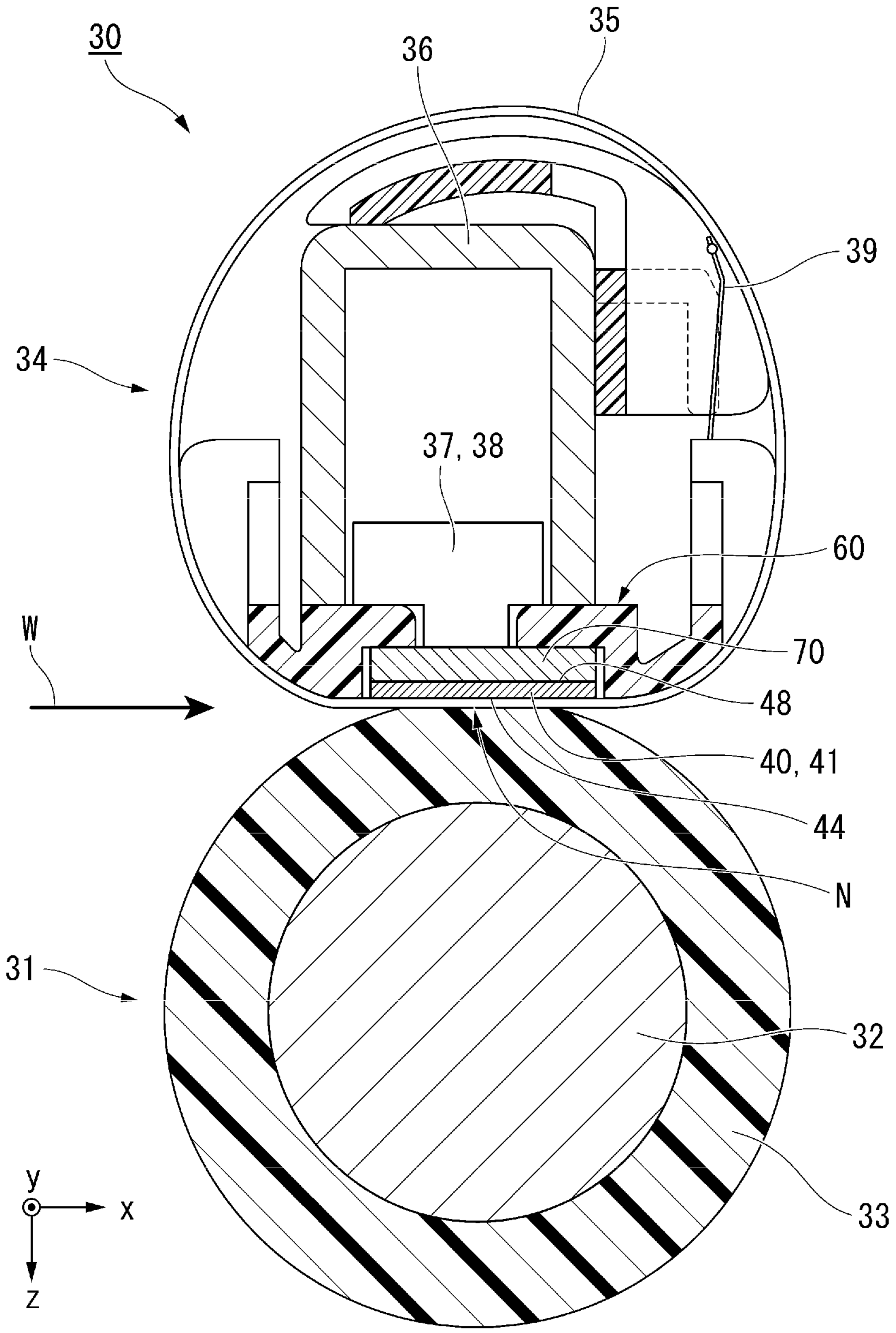
FIG. 2 is a sectional view of a fixing device.

FIG. 2 is a sectional view of the fixing device 30. The fixing device 30 includes a pressurizing roller 31 and a heating roller 34. A nip N is formed between the pressurizing roller 31 and the heating roller 34.

In this application, a z direction (e.g., a third direction), an x direction (e.g., a second direction), and a y direction (e.g., a first direction) of an orthogonal coordinate system are defined as follows. The z direction is the thickness direction of a substrate 41 and is a direction in which the heating roller 34 and the pressurizing roller 31 are disposed side by side. A +z direction (e.g., a first side in the third direction) is a direction from the heating roller 34 to the pressurizing roller 31. A −z direction (e.g., a second side in the third direction) is the opposite direction of the +z direction. The x direction is the latitudinal direction of the substrate 41 and is a conveying direction of the sheet S in the nip N. A +x direction is a downstream side in the conveying direction of the sheet S. A −x direction is the opposite direction of the +x direction. The y direction is the longitudinal direction of the substrate 41 and is the axial direction of a tubular film 35 of the heating roller 34. In x, y, and z directions, the center side of the substrate 41 or a heat transfer member 70 is sometimes called an inner side of the substrate 41 or the heat transfer member 70. In the x, y, and z directions, the opposite side of the center of the substrate 41 or the heat transfer member 70 is sometimes called outer side of the substrate 41 or the heat transfer member 70.

The pressurizing roller 31 pressurizes a toner image on the sheet S that entered the nip N. The pressurizing roller 31 includes a cored bar 32 and an elastic layer 33. A configuration of the pressurizing roller 31 is not limited to the configuration explained above and can be various configurations.

The cored bar 32 is formed in a columnar shape by a metal material such as stainless steel. The elastic layer 33 is formed of an elastic material such as silicone rubber. The elastic layer 33 has fixed thickness on the outer circumferential surface of the cored bar 32. A release layer may be made of a resin material such as PFA (tetrafluoroethylene-perfluoroalkylvinylether copolymer) and may be present on the outer circumferential surface of the elastic layer 33.

The pressurizing roller 31 is driven by a motor and rotates. If the pressurizing roller 31 rotates in a state in which the nip N is formed, the tubular film 35 of the heating roller 34 rotates following the rotation of the pressurizing roller 31. The pressurizing roller 31 conveys the sheet S in a conveying direction W by rotating in a state in which the sheet S is present in the nip N.

The heating roller 34 heats a toner image on the sheet S that entered the nip N. The heating roller 34 includes a tubular film (e.g., a tubular body) 35, a heater unit (e.g., a heater, a heating device, etc.) 40, the heat transfer member 70, a supporting member 60, a frame 36, and heat sensitive elements 37 to 39. A configuration of the heating roller 34 is not limited to the configuration explained above and can be various configurations.

The tubular film 35 is tubular (e.g., pipe-shaped, hollow cylinder, etc.). The tubular film 35 includes a base layer, an elastic layer, and a release layer in order from the inner circumference side. The base layer is formed of a resin material such as polyimide (PI) for achieving a reduction in thermal capacity. The elastic layer is formed of an elastic material such as silicone rubber. The release layer is formed of a material such as PFA resin.

The heater 40 is present on the inner side of the tubular film 35. The heater 40 is in contact with the inner surface of the tubular film 35 via grease on a first surface 44 in the +z direction.

Figure 3:
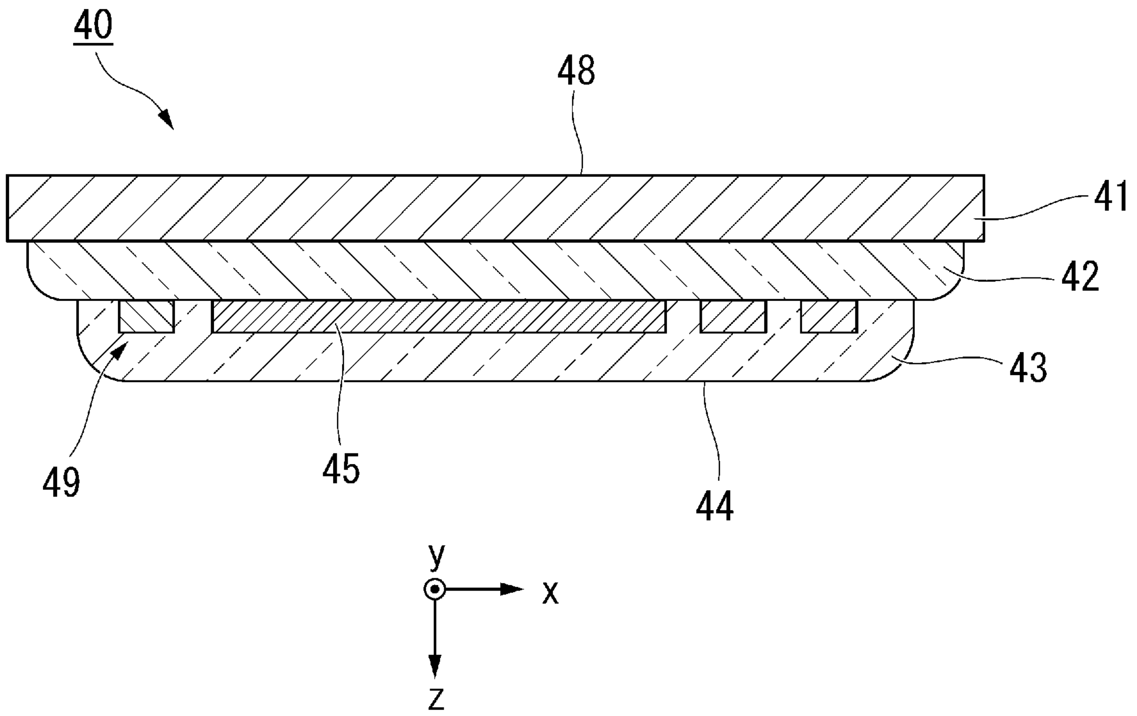
FIG. 3 is a sectional view of a heater unit taken along a III-III line in FIG. 4.
Figure 4:
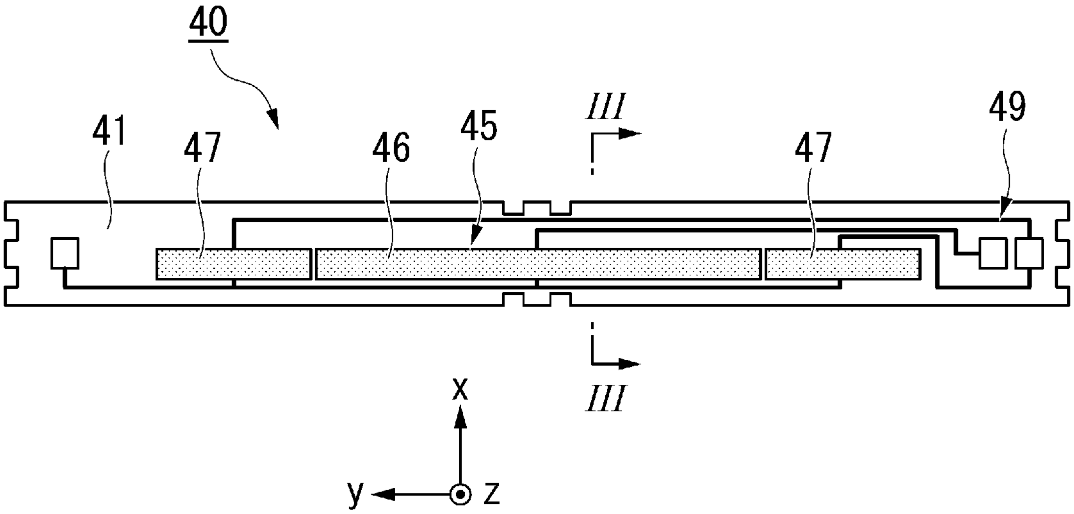
FIG. 4 is a plan view of the heater unit.

FIG. 3 is a sectional view of the heater 40 taken along a III-III line in FIG. 4. FIG. 4 is a plan view (e.g., a view from the +z direction) of the heater 40. The heater 40 includes the substrate 41, a heat generating body 45, and a wire 49.

The substrate 41 is formed of a metal material such as stainless steel. As illustrated in FIG. 4, the substrate 41 has an elongated substantially rectangular plate shape. The heater 40 is disposed with the longitudinal direction of the substrate 41 aligned with the axial direction of the tubular film 35. As illustrated in FIG. 3, a first electric insulating layer 42 is formed of a glass material or the like on the surface in the +z direction of the substrate 41. Like the first electric insulating layer 42 formed in the +z direction of the substrate 41, a first electric insulating layer may be formed in the −z direction of the substrate 41.

The heat generating body 45 is formed of a silver palladium alloy or the like. The heat generating body 45 is energized (e.g., turned on, provided electricity, provided energy, etc.) to generate heat. The heat generating body 45 and the wire 49 are disposed via (e.g., positioned within, surrounded by, etc.) the first electric insulating layer 42 on the surface in the +z direction of the substrate 41. A second electric insulating layer 43 is formed of a glass material or the like to cover the heat generating body 45 and the wire 49. Like the second electric insulating layer 43 formed in the +z direction of the substrate 41, a second electric insulating layer may be formed in the −z direction of the substrate 41.

As illustrated in FIG. 4, the heat generating body 45 includes a center heat generating body 46 and a pair of end heat generating bodies (e.g., a first end heat generating body and a second end heat generating body) 47. The center heat generating body 46 is present in the center in the y direction of the heater 40. The pair of end heat generating bodies 47 is present on both the sides in the y direction of the center heat generating body 46. The sheet S passes through the nip N of the fixing device 30 with the center in the y direction of the sheet S aligned with the center in the y direction of the fixing device 30. For example, in the case of the sheet S having small width in the y direction, the control section 6 causes only the center heat generating body 46 to generate heat. For example, in the case of the sheet S having large width in the y direction, the control section 6 causes all of the center heat generating body 46 and the pair of end heat generating bodies 47 to generate heat. The center heat generating body 46 and the pair of end heat generating bodies 47 are controlled to generate heat independently of each other. The pair of end heat generating bodies 47 is controlled to generate heat in the same manner.

The heat transfer member 70 illustrated in FIG. 2 is formed of a metal material having high thermal conductivity such as copper. The heat transfer member 70 has an elongated substantially rectangular plate shape. The external shape of the heat transfer member 70 is equivalent to the external shape of the substrate 41 of the heater 40. The heat transfer member 70 is in contact with at least a part of a second surface 48 in the −z direction of the heater 40. The thermal conductivity of the heat transfer member 70 is larger than the thermal conductivity of the substrate 41 of the heater 40. A temperature distribution in the y direction of the heater 40 is equalized via the heat transfer member 70.

The supporting member 60 is present on the inner side of the tubular film 35. The supporting member 60 is formed of a high heat-resistant resin material or the like such as liquid crystal polymer. The supporting member 60 supports the end face in the −z direction of the heat transfer member 70. The supporting member 60 covers both the sides in the x direction of the heater 40 and the heat transfer member 70. The surface in the +z direction of the supporting member 60 is formed as a curved surface along the inner surface of the tubular film 35 and is in contact with the inner surface of the tubular film 35. The supporting member 60 stabilizes a posture during rotation of the tubular film 35.

The frame 36 is present on the inner side of the tubular film 35. The frame 36 is formed of a steel plate material or the like. The frame 36 is attached in the −z direction of the supporting member 60. The frame 36 extends in the y direction. Both the ends in the y direction of the frame 36 are fixed to the housing 10 of the image forming apparatus 1. The frame 36 supports the heat transfer member 70 and the heater 40 via the supporting member 60.

The heat sensitive elements (e.g., elements 37, 38, and 39) are a heater thermometer 37, a thermostat 38, and a film thermometer 39. The heater thermometer 37 and the thermostat 38 are present in the −z direction of the heat transfer member 70. The heater thermometer 37 measures the temperature of the heat transfer member 70. If the temperature of the heat transfer member 70 exceeds a predetermined temperature, the thermostat 38 interrupts the energization (e.g., stops providing energy, turns off, etc.) to the heat generating body 45. The film thermometer 39 is in contact with the inner circumferential surface of the tubular film 35 and measures the temperature of the tubular film 35. The film thermometer 39 measures the temperature of the tubular film 35 in positions in the y direction corresponding to the center heat generating body 46 and the end heat generating bodies 47.

Figure 5:
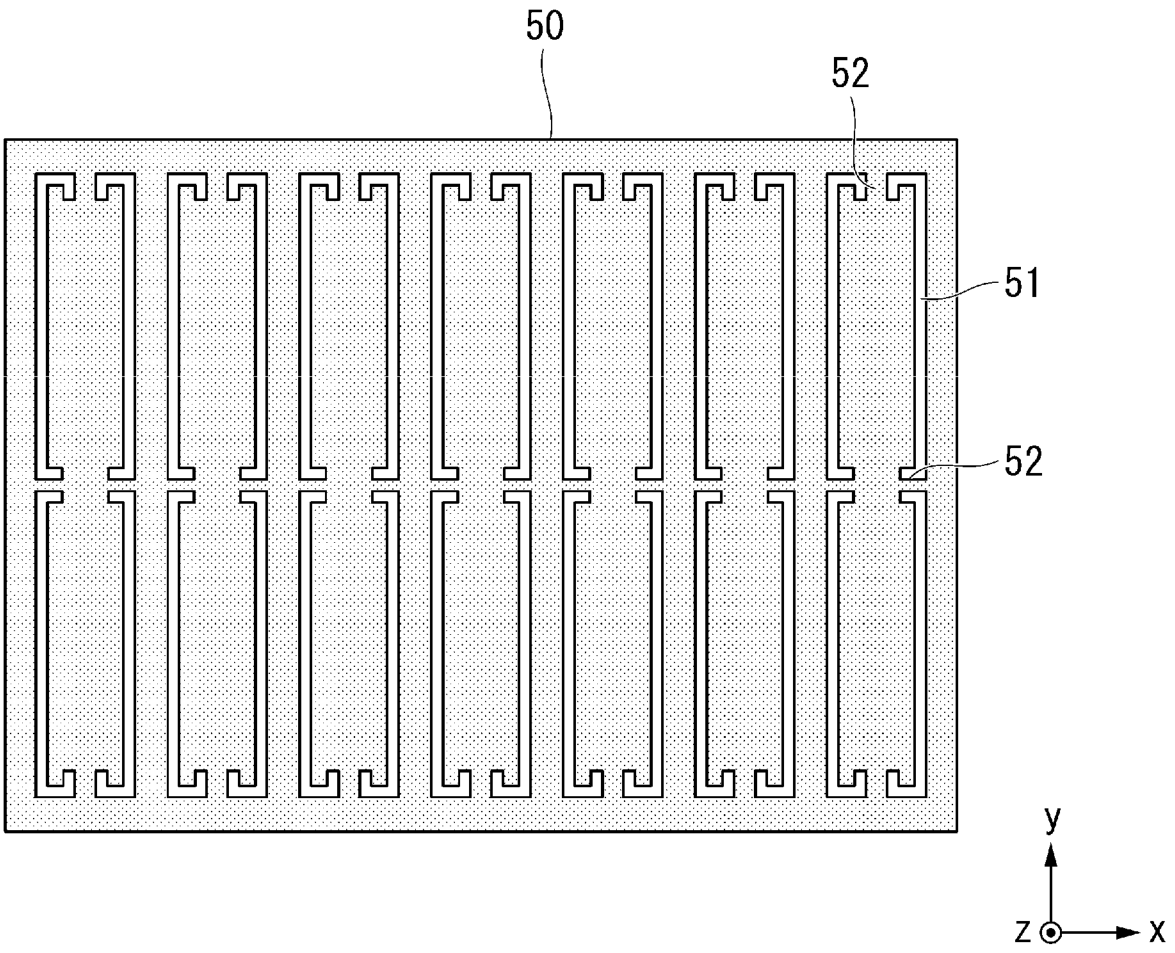
FIG. 5 is a plan view of a base material of a substrate.

FIG. 5 is a plan view of a base material 50 of the substrate 41. The substrate 41 of the heater 40 is formed on the base material 50. A plurality of substrates 41 are formed side by side on the base material 50. Slits 51 extending along the external shape of the substrate 41 are formed on the base material 50. The slits 51 are formed by etching or the like. The substrate 41 is coupled to the base material 50 by coupling sections 52 extending across the slits 51. The heater 40 including the substrate 41 is formed in a state in which the substrate 41 is coupled to the base material 50. A manufacturing process for the heater 40 is implemented on the surface of the substrate 41 coupled to the base material 50. The base material 50 is separated from the substrate 41 and the heater 40 is completed. The coupling sections 52 are cut off by a cutting tool and the substrate 41 is separated from the base material 50.

Figure 6:
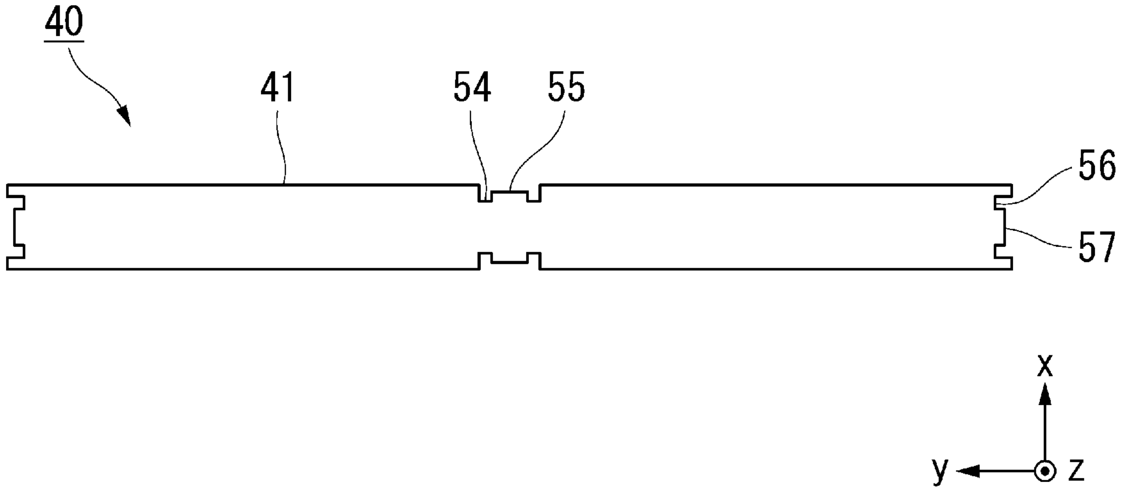
FIG. 6 is a plan view of the heater unit cut off from the base material.

FIG. 6 is a plan view of the heater 40 cut off from the base material 50. In FIG. 6, illustration of the heat generating body 45 and the like on the surface of the substrate 41 is omitted. The substrate 41 includes first cut sections (e.g., a plurality of first cut sections) 55 and second cut sections (e.g., a plurality of second cut section) 57 uncoupled from the base material 50.

The substrate 41 includes first recesses (e.g., a plurality of first recesses) 54 and second recesses (e.g., a plurality of second recess) 56.

The second recesses 56 are present at both the ends in the y direction of the substrate 41. The second cut sections 57 are present on the inner side of the second recesses 56.

The first recesses 54 are present at both the ends in the x direction and in the center in the y direction of the substrate 41. The first recesses 54 are hollowed from the ends in the x direction of the substrate 41 toward the inner side in the x direction of the substrate 41. The first cut sections 55 are present on the inner side of the first recesses 54. The coupling sections 52 illustrated in FIG. 5 are disposed on the inner side of the first recesses 54. Consequently, the coupling sections 52 increase in length to make it easy to cut the coupling sections 52. The coupling sections 52 are cut on the inner side of the first recesses 54. As illustrated in FIG. 6, the distal ends of the first cut sections 55 less easily project to the outer side in the x direction of the first recesses 54. Consequently, interference between the supporting member 60 illustrated in FIG. 2 and the first cut sections 55 is suppressed (e.g., minimized, etc.).

Figure 7:
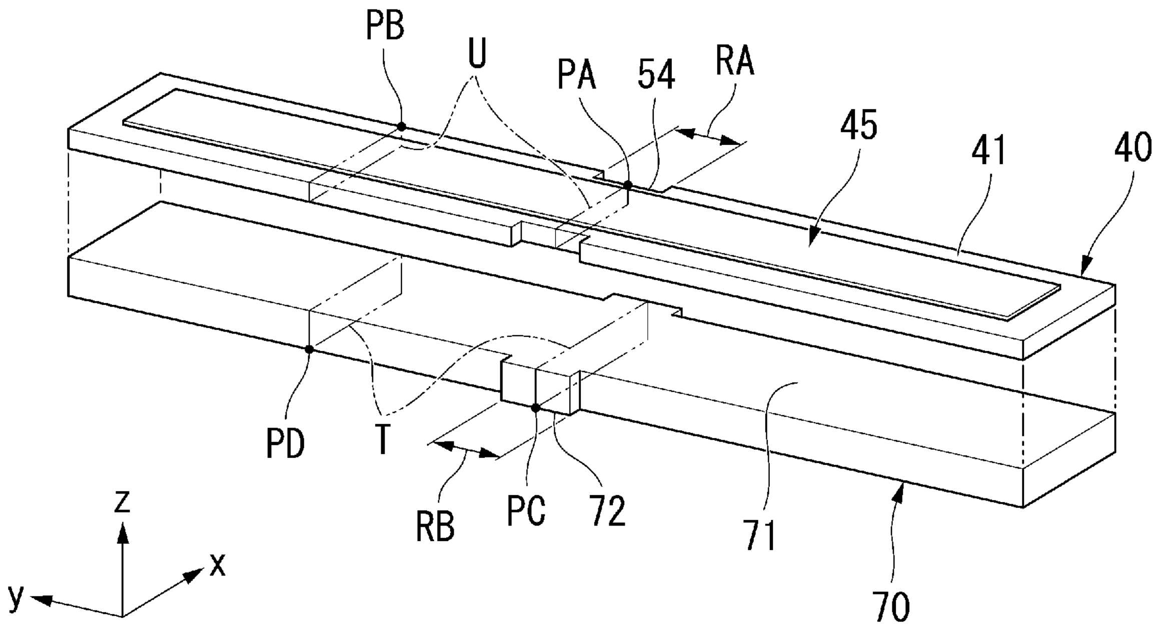
FIG. 7 is an exploded perspective view of the heater unit and a heat transfer member in an embodiment.
Figure 8:
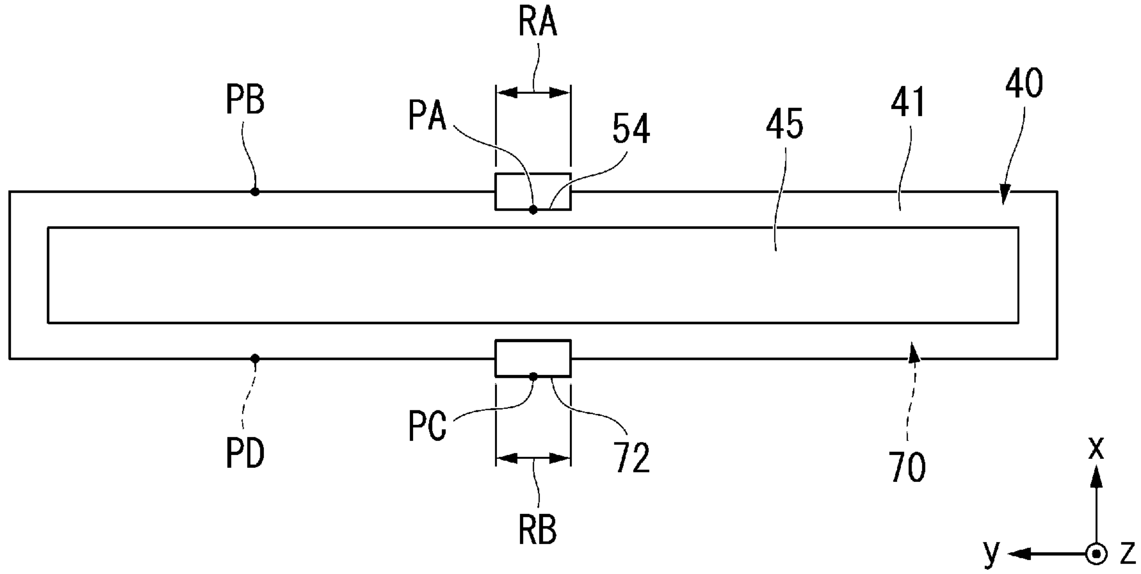
FIG. 8 is a plan view of the heater unit and the heat transfer member.

FIG. 7 is an exploded perspective view of the heater 40 and the heat transfer member 70 in the embodiment. FIG. 8 is a plan view of the heater 40 and the heat transfer member 70. The first recesses 54 are present in a first region RA of the substrate 41.

The substrate 41 includes the first region RA in a part in the y direction. The first region RA is present in a position overlapping the heat generating body 45 in the y direction. The substrate 41 includes a first position PA and a second position PB. The first position PA is present on the inner side of the first region RA in the y direction. The second position PB is present on the outer side of the first region RA in the y direction. As illustrated in FIG. 7, an area of a cross section orthogonal to the y direction of the substrate 41 is represented as a first area U. The first area U in the first position PA is smaller than the first area U in the second position PB.

The substrate 41 includes the first recesses 54 in the first region RA. The first recesses 54 are present at both the ends in the x direction and in the center in the y direction of the substrate 41. The first recesses 54 are hollowed from the ends in the x direction of the substrate 41 toward the inner side in the x direction of the substrate 41.

The heat transfer member 70 includes a second region RB in a part in the y direction. The second region RB is present in a position overlapping the heat generating body 45 in the y direction. The heat transfer member 70 includes a third position PC and a fourth position PD. The third position PC is present on the inner side of the second region RB in the y direction. The fourth position PD is present on the outer side of the second region RB in the y direction. As illustrated in FIG. 7, an area of a cross section orthogonal to the y direction of the heat transfer member 70 is represented as a second area T. The second area T in the third position PC is larger than the second area T in the fourth position PD.

The heat transfer member 70 includes projections 72 in the second region RB. The projections 72 are present at both the ends in the x direction and in the center in the y direction of the substrate 41. The projections 72 project (e.g., extend, etc.) from the ends in the x direction of the heat transfer member 70 toward the outer side in the x direction of the heat transfer member 70. The fixing device 30 is made more compact in the z direction compared with if the projections 72 projected in the z direction of the heat transfer member 70.

Figure 9:
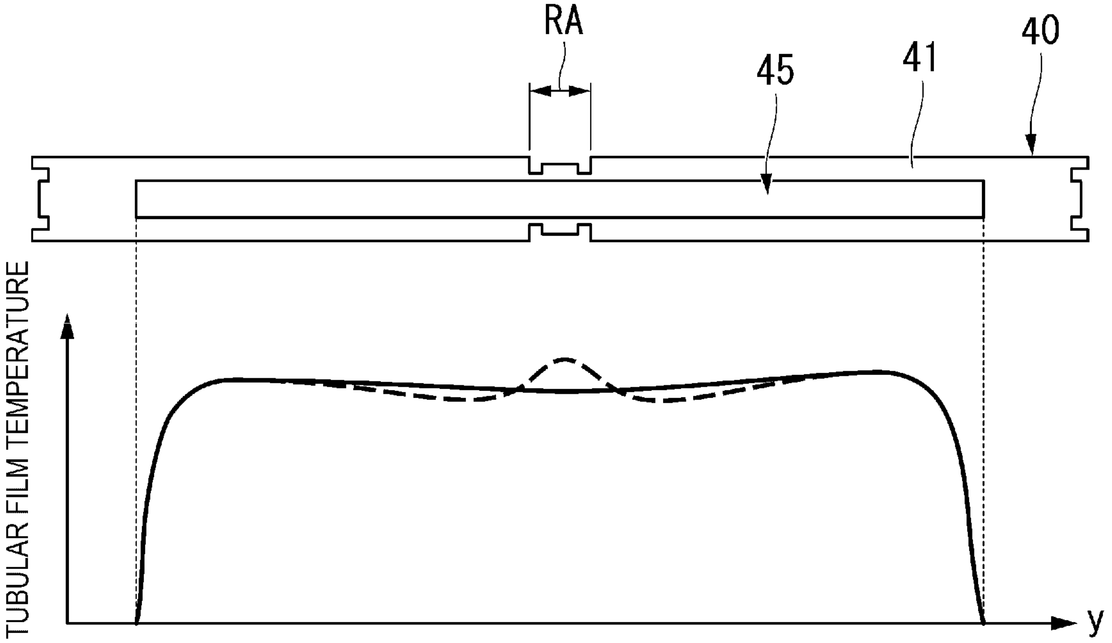
FIG. 9 is a graph illustrating a temperature distribution on the surface of a tubular film.

The first area U of the cross section orthogonal to the y direction is smaller on the inner side of the first region RA of the substrate 41 compared with the outer side of the first region RA. The first region RA is present in a position overlapping the heat generating body 45 in the y direction. A thermal capacity of the substrate 41 on the inner side of the first region RA is smaller compared with the outer side of the first region RA. As illustrated in FIG. 2, the tubular film 35 is in contact with the first surface 44 of the heater 40 including the substrate 41. FIG. 9 is a graph illustrating a temperature distribution of the tubular film 35 in a contact position with the heater 40. A broken line in FIG. 9 indicates a temperature distribution of the tubular film 35 in the case in which the heat transfer member 70 does not include the projections 72. The temperature of the tubular film 35 is higher in a position corresponding to the inner side of the first region RA of the substrate 41 compared with a position corresponding to the outer side of the first region RA. Consequently, glossiness of an image formed on the sheet S is deteriorated.

As illustrated in FIG. 7, the second area T of the cross section orthogonal to the y direction is larger on the inner side of the second region RB of the heat transfer member 70 compared with the outer side of the second region RB. The thermal capacity of the heat transfer member 70 on the inner side of the second region RB is larger compared with the outer side of the first region RA.

In the y direction, at least a part of the second region RB of the heat transfer member 70 overlaps at least a part of the first region RA of the substrate 41. In an example illustrated in FIG. 8, substantially the entire second region RB overlaps substantially the entire first region RA. That is, the second region RB and the first region RA coincide. In the y direction, the length of the second region RB and the length of the first region RA are equal.

The heat transfer member 70 is in contact with the heater 40. Heat of the heater 40 is transmitted to the heat transfer member 70. An increase in the thermal capacity in the second region RB of the heat transfer member 70 supplements a decrease in the thermal capacity in the first region RA of the substrate 41 of the heater 40. In a set of the heat transfer member 70 and the heater 40, the thermal capacity in the y direction is equal. A solid line in FIG. 9 indicates a temperature distribution of the tubular film 35 in the embodiment in which the heat transfer member 70 includes the projections 72. The temperature of the tubular film 35 is equalized in the y direction. Consequently, deterioration in the quality of an image formed on the sheet S is suppressed (e.g., minimized, etc.).

A first modification of the embodiment is explained.

Figure 10:
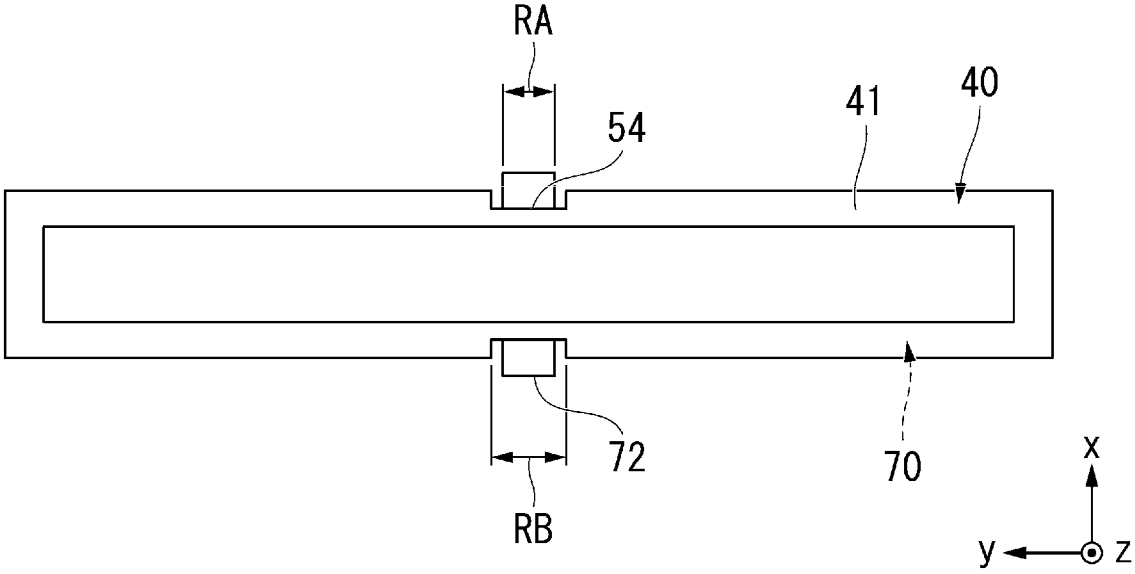
FIG. 10 is a plan view of the heater unit and the heat transfer member in a first modification.

FIG. 10 is a plan view of the heater 40 and the heat transfer member 70 in the first modification of the embodiment. The explanation of the first modification about similarities to the embodiment is sometimes omitted.

In the first modification, the entire second region RB of the heat transfer member 70 overlaps a part of the first region RA of the substrate 41. The entire second region RB is included in the first region RA. In order to equalize the temperature in the y direction of the heater 40, the thickness in the z direction of the heat transfer member 70 is larger (e.g., greater than, etc.) than the thickness of the substrate 41. The length in the y direction of the projections 72 of the heat transfer member 70 may be smaller than the length of the first recesses 54 of the substrate 41.

In the first modification as well, an increase in the thermal capacity in the second region RB of the heat transfer member 70 supplements a decrease in the thermal capacity in the first region RA of the substrate 41 of the heater 40. The temperature of the tubular film 35 is equalized in the y direction. Deterioration in the quality of an image formed on the sheet S is suppressed.

A second modification of the embodiment is explained.

Figure 11:
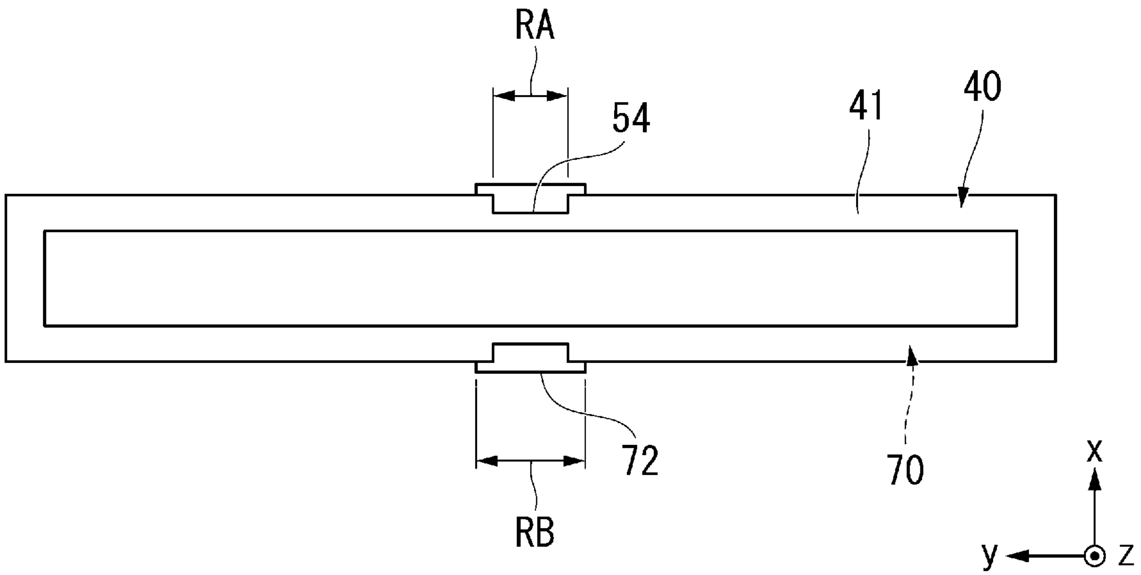
FIG. 11 is a plan view of the heater unit and the heat transfer member in a second modification.

FIG. 11 is a plan view of the heater 40 and the heat transfer member 70 in the second modification of the embodiment. The explanation of the second modification about similarities to the embodiment is sometimes omitted.

In the second modification, a part of the second region RB of the heat transfer member 70 overlaps the entire first region RA of the substrate 41. The second region RB includes the entire first region RA. The length in the y direction of the projections 72 of the heat transfer member 70 is larger than the length of the first recesses 54 of the substrate 41. The height in the x direction of the projections 72 of the heat transfer member 70 may be smaller than the depth in the x direction of the first recesses 54 of the substrate 41.

Also in the second modification, an increase in the thermal capacity in the second region RB of the heat transfer member 70 supplements a decrease in the thermal capacity in the first region RA of the substrate 41 of the heater 40. The temperature of the tubular film 35 is equalized in the y direction. Deterioration in the quality of an image formed on the sheet S is suppressed.

A third modification of the embodiment is also explained.

Figure 12:
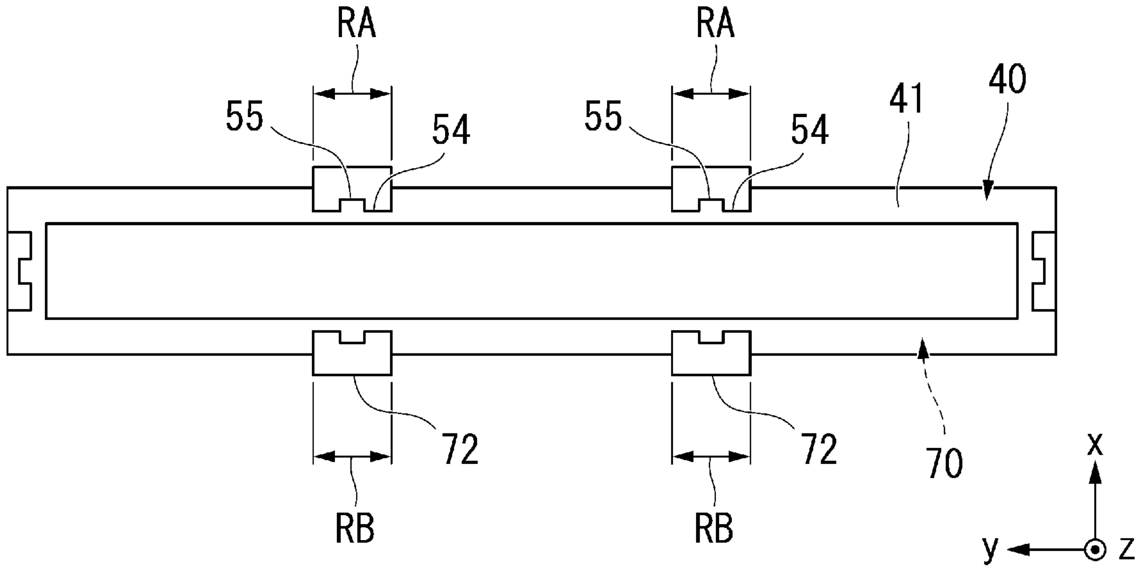
FIG. 12 is a plan view of the heater unit and the heat transfer member in a third modification.

FIG. 12 is a plan view of the heater 40 and the heat transfer member 70 in the third modification of the embodiment. The explanation of the third modification about similarities to the embodiment is sometimes omitted.

The substrate 41 in the third modification includes first regions RA discontinuously disposed in the y direction. For example, a plurality of first regions RA are present in positions that equally divide the substrate 41 in the y direction. The substrate 41 includes the first recesses 54 in each of the plurality of first regions RA. A plurality of first recesses 54 are present at one end in the x direction of the substrate 41. Pluralities of first recesses 54 are respectively present at both the ends in the x direction of the substrate 41.

The first cut section 55 is present on the inner side of each of the plurality of first recesses 54. The first cut section 55 is a section where the coupling section 52 (see FIG. 5) of the substrate 41 and the base material 50 is cut off. Pluralities of coupling sections 52 are disposed at both the ends in the x direction of the substrate 41. The substrate 41 is stably supported by the base material 50. Accuracy of a manufacturing process for the heater 40 on the substrate 41 is improved. Fluctuation in the performance of the heater unit 40 is suppressed.

The heat transfer member 70 includes second regions RB discontinuously disposed in the y direction. The heat transfer member 70 includes the projections 72 in each of a plurality of second regions RB. The second region RB of the heat transfer member 70 and the first region RA of the substrate 41 coincide. An increase in the thermal capacity in the second region RB of the heat transfer member 70 supplements a decrease in the thermal capacity in the first region RA of the substrate 41 of the heater unit 40. The temperature of the tubular film 35 is equalized in the y direction. Deterioration in the quality of an image formed on the sheet S is suppressed.

A fourth modification of the embodiment is explained.

Figure 13:
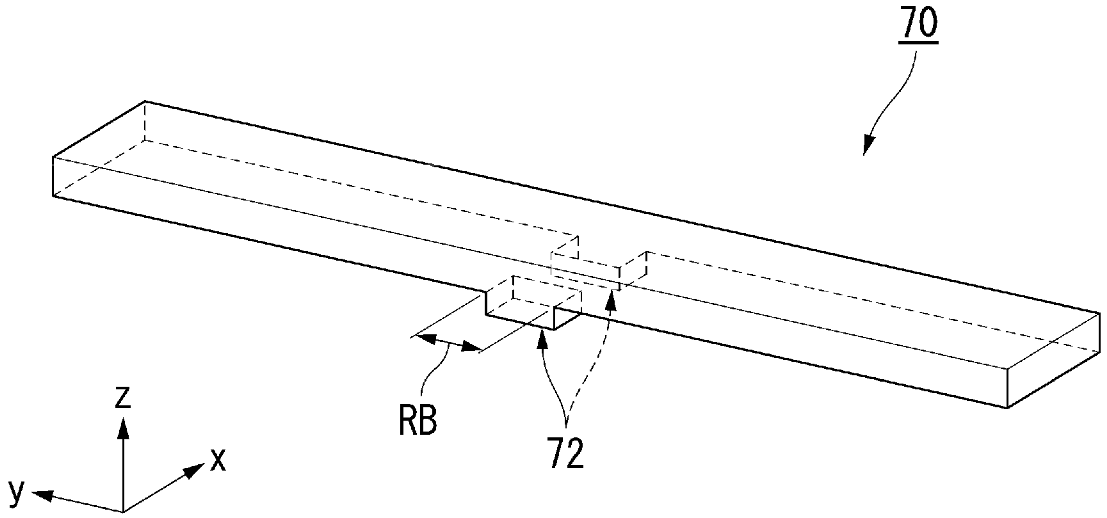
FIG. 13 is a perspective view of the heat transfer member in a fourth modification.

FIG. 13 is a perspective view of the heat transfer member 70 in the fourth modification of the embodiment. The explanation of the fourth modification about similarities to the embodiment is sometimes omitted.

The heat transfer member 70 includes the projections 72 in the second region RB. The projections 72 in the fourth modification project from the end in the z direction of the heat transfer member 70 toward the outer side in the z direction. The fixing device 30 is made more compact in the x direction compared with if the projections 72 project in the x direction of the heat transfer member 70. The projections 72 project in the −z direction from the surface in the −z direction of the heat transfer member 70. The projections 72 are present at both the ends in the x direction and in the center in the y direction of the heat transfer member 70. The heat transfer member 70 is integrally formed to include the projections 72.

In the fourth modification as well, an increase in the thermal capacity in the second region RB of the heat transfer member 70 supplements a decrease in the thermal capacity in the first region RA of the substrate 41 of the heater 40. The temperature of the tubular film 35 is equalized in the y direction. Deterioration in the quality of an image formed on the sheet S is suppressed.

A fifth modification of the embodiment is explained.

Figure 14:
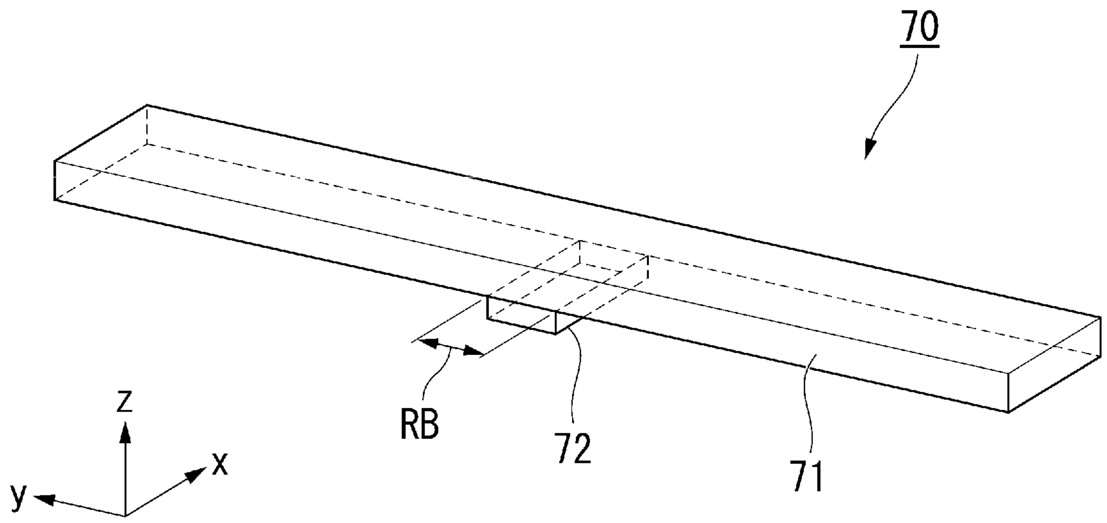
FIG. 14 is a perspective view of the heat transfer member in a fifth modification.

FIG. 14 is a perspective view of the heat transfer member 70 in the fifth modification of the embodiment. The explanation of the fifth modification about similarities to the embodiment is sometimes omitted.

The heat transfer member 70 includes the projection 72 in the second region RB. In the heat transfer member 70 in the fifth modification, a heat transfer member main body 71 and the projection 72 are separate. The heat transfer member main body 71 has an elongated rectangular plate shape. The projection 72 may be formed of the same material as the material of the heat transfer member main body 71 or may be formed of a material different from the material of the heat transfer member main body 71. The projection 72 is attached to the surface in the −z direction of the heat transfer member main body 71 by an adhesive or the like. The projection 72 projects from the end in the z direction of the heat transfer member main body 71 toward the outer side in the z direction. The fixing device 30 is made more compact in the x direction compared with if the projection 72 projects in the x direction of the heat transfer member 70. For example, the length in the x direction of the projection 72 is equal to the length of the heat transfer member main body 71. The projection 72 is attached to the center in the y direction of the heat transfer member main body 71.

In the fifth modification as well, an increase in the thermal capacity in the second region RB of the heat transfer member 70 supplements a decrease in the thermal capacity in the first region RA of the substrate 41 of the heater unit 40. The temperature of the tubular film 35 is equalized in the y direction. Deterioration in the quality of an image formed on the sheet S is suppressed.

A sixth modification of the embodiment is explained.

Figure 15:
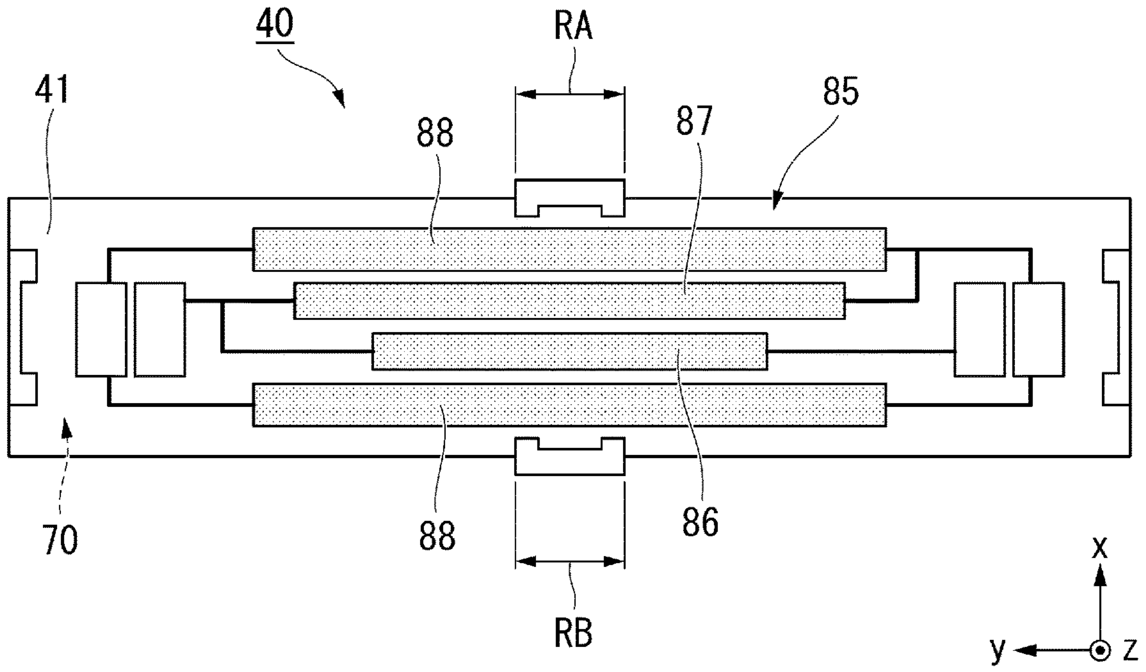
FIG. 15 is a plan view of the heater unit and the heat transfer member in a sixth modification.

FIG. 15 is a plan view of the heater 40 and the heat transfer member 70 in the sixth modification of the embodiment. The explanation of the sixth modification about similarities to the embodiment is sometimes omitted.

The heater 40 in the sixth modification includes a heat generating body (e . . . g, a heating body, a heater body, etc.) 85 on the surface of the substrate 41. The heat generating body 85 is long in the y direction. The heat generating body 85 has a plane symmetrical shape with respect to an xz plane in the center in the y direction of the substrate 41.

The heat generating body 85 includes a first sub-heater 86, a second sub-heater 87, and a pair of main heaters (e.g., a first main heater and a second main heater) 88. The first sub-heater 86, the second sub-heater 87, and the pair of main heaters 88 respectively have rectangular shapes having the y direction as a longitudinal direction. The pair of main heaters 88 is present at both the ends in the x direction of the substrate 41. The first sub-heater 86 and the second sub-heater 87 are present in the center in the x direction of the substrate 41. The length in the y direction of the heat generating body 85 is the smallest in the first sub-heater 86 and is the largest in the pair of main heaters 88. The length in the y direction of the second sub-heater 87 is larger than the length of the first sub-heater 86 and is smaller than the length of the pair of main heaters 88.

For example, in the case of the sheet S having small width in the y direction, the control section 6 causes the first sub-heater 86 or the second sub-heater 87 to generate heat. For example, in the case of the sheet S having large width in the y direction, the control section 6 causes the pair of main heaters 88 to generate heat. The heat generating body 85 is present in the center in the y direction of the substrate 41. The center in the y direction of the heater 40 generates heat irrespective of a size of the sheet S.

In the sixth modification as well, an increase in the thermal capacity in the second region RB of the heat transfer member 70 supplements a decrease in the thermal capacity in the first region RA of the substrate 41 of the heater 40. The temperature of the tubular film 35 is equalized in the y direction. Deterioration in the quality of an image formed on the sheet S is suppressed.

A seventh modification of the embodiment is explained.

Figure 16:
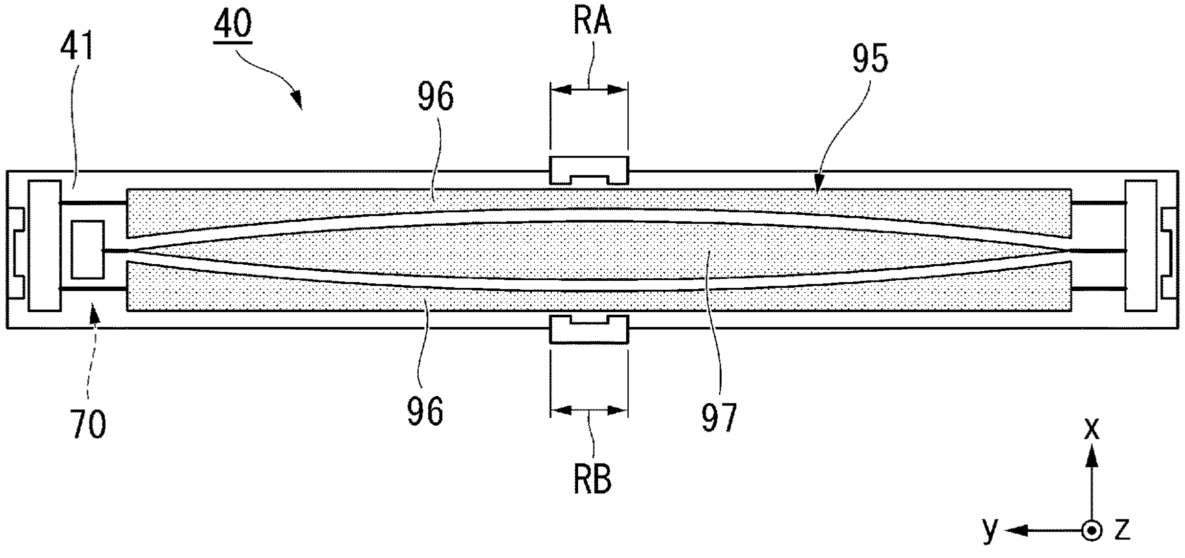
FIG. 16 is a plan view of the heater unit and the heat transfer member in a seventh modification.

FIG. 16 is a plan view of the heater 40 and the heat transfer member 70 in the seventh modification of the embodiment. The explanation of the seventh modification about similarities to the embodiment is sometimes omitted.

The heater 40 in the seventh modification includes a heat generating body 95 on the surface of the substrate 41. The heat generating body 95 is long in the y direction. The heat generating body 95 has a plane symmetrical shape with respect to the xz plane in the center in the y direction of the substrate 41.

The heat generating body 95 includes a pair of main heaters 96 and a sub-heater 97. The pair of main heaters 96 is present at both the ends in the x direction of the substrate 41. The sub-heater 97 is present in the center in the x direction of the substrate 41. The lengths in the y direction of the pair of main heaters 96 and the sub-heater 97 are equal. The width in the x direction of the main heaters 96 is smallest in the center in the y direction and increases from the center to both the ends in the y direction. A heat generation amount of the main heaters 96 is the largest in the center in the y direction and decreases from the center to both the ends in the y direction. The width in the x direction of the sub-heater 97 is the largest in the center in the y direction and decreases from the center to both the ends in the y direction. A heat generation amount of the sub-heater 97 is the smallest in the center in the y direction and increases from the center to both the ends in the y direction.

For example, in the case of the sheet S having small width in the y direction, the control section 6 causes the pair of main heaters 96 to generate heat. For example, in the case of the sheet S having large width in the y direction, the control section 6 causes the pair of main heaters 96 and the sub-heater 97 to generate heat. In the seventh modification, the pair of main heaters 96 generates heat irrespective of a size of the sheet S. The heat generation amount of the pair of main heaters 96 is largest in the center in the y direction.

In the seventh modification as well, an increase in the thermal capacity in the second region RB of the heat transfer member 70 supplements a decrease in the thermal capacity in the first region RA of the substrate 41 of the heater unit 40. The temperature of the tubular film 35 is equalized in the y direction. Deterioration in the quality of an image formed on the sheet S is suppressed.

According to at least one embodiment explained above, the heater 40 includes the heat transfer member 70 in which at least a part of the second region RB overlaps at least a part of the first region RA of the substrate 41. Consequently, it is possible to suppress deterioration in the quality of an image formed on the sheet S.

While certain embodiments have been described, these embodiments have been presented by way of example only, and are not intended to limit the scope of the disclosure. Indeed, the novel embodiments described herein may be embodied in a variety of other forms: furthermore various omissions, substitutions and changes in the form of the embodiments described herein may be made without departing from the spirit of the disclosure. The accompanying claims and there equivalents are intended to cover such forms or modifications as would fall within the scope and spirit of the disclosure.

What is claimed is:

1. A fixing device comprising:

a tubular body defining a first direction along a tubular axis;

a heater positioned on an inner side of the tubular body, the heater comprising:

a substrate that supports a heat generating body, the substrate comprising:

a first region positioned along the first direction, a first area being a cross section orthogonal to the first direction, wherein the first area in a first position on an inner side of the first region is smaller than the first area in a second position present on an outer side of the first region; and a heat transfer member in contact with the heater, the heat transfer member comprising:

a second region positioned along the first direction, a second area being a cross section orthogonal to the first direction, wherein the second area in a third position on an inner side of the second region is larger than the second area in a fourth position present on an outer side of the second region, and wherein at least a part of the second region overlaps at least a portion of the first region along the first direction, and wherein thermal conductivity of the heat transfer member is larger than thermal conductivity of the substrate.

2. The device according to claim 1, wherein the substrate includes a recess in the first region, and the heat transfer member includes a projection in the second region.

3. The device according to claim 2, wherein the substrate includes a cut section uncoupled from a base material positioned on an inner side of the recess.

4. The device according to claim 3, wherein the substrate further defines a second direction orthogonal to the first direction, and wherein, a plurality of the recesses are present at one end of the substrate in the second direction.

5. The device according to claim 2, wherein the substrate further defines a second direction orthogonal to the first direction, and wherein the recess is hollowed from an end toward an inner side of the substrate in the second direction.

6. The device according to claim 2, wherein the heat transfer member further defines a second direction orthogonal to the first direction, and wherein the projection extends from an end toward an outer side of the heat transfer member in the second direction.

7. The device according to claim 2, wherein the substrate further defines a second direction orthogonal to the first direction and a third direction orthogonal to each of the first direction and the second direction, wherein the projection extends from an end toward an outer side of the heat transfer member in the third direction.

8. The device according to claim 1, wherein the first region overlaps the heat generating body in the first direction.

9. The device according to claim 1, wherein, a thickness of the substrate defines a third direction, a first surface of the heater is in contact with an inner surface of the tubular body, a second surface of the heater is opposite the first surface of the heater in the third direction, and the second surface is in contact with the heat transfer member.

10. The device according to claim 9, wherein a thickness of the heat transfer member in the third direction is greater than the thickness of the substrate in the third direction.

11. The device according to claim 10, wherein, the entire second region of the heat transfer member overlaps the first region of the substrate.

12. The device according to claim 10, wherein a length of a projection of the heat transfer member is less than a length of a recess of the substrate in the first direction.

13. The device according to claim 10, wherein a thermal capacity in the second region of the heat transfer member is larger than a thermal capacity in the first region of the substrate.

14. The device according to claim 10, wherein a length of a projection of the heat transfer member is greater than a length of a recess of the substrate in the first direction.

15. The device according to claim 14, wherein the substrate defines a second direction orthogonal to the first direction and includes a recess in the first region, and the heat transfer member includes a projection in the second region, wherein a height of the projection is less than a depth of the recess in the second direction.

16. A fixing device comprising:

a tubular body defining a first direction along a tubular axis;

a heater positioned on an inner side of the tubular body, the heater comprising:

a substrate that supports a heat generating body, the substrate comprising:

a first region positioned along the first direction, a first area being a cross section orthogonal to the first direction, wherein the first area in a first position on an inner side of the first region is smaller than the first area in a second position present on an outer side of the first region;

a heater body positioned on a surface of the substrate along the first direction, and a heat transfer member in contact with the heater, the heat transfer member comprising:

a second region positioned along the first direction, a second area being a cross section orthogonal to the first direction, wherein the second area in a third position on an inner side of the second region is larger than the second area in a fourth position present on an outer side of the second region, and wherein the second region overlaps at least a portion of the first region along the first direction, and wherein thermal conductivity of the heat transfer member is larger than thermal conductivity of the substrate.

17. The device according to claim 16, wherein the heater body further comprises:

a first sub-heater; and a first main heater and a second main heater, wherein the first sub-heater is positioned between the first main heater and the second main heater.

18. The device according to claim 17, wherein a length in the first direction of the each of the first sub-heater, the first main heater, and the second main heater are substantially equal, and wherein a width of the first sub-heater defined in a second direction orthogonal to the first direction is largest in the center and the width decreases along the first direction towards each end of the heater body.

19. The device according to claim 17, further comprising:

a second sub-heater positioned between the first main heater and the second main heater, and wherein the second sub-heater is greater in length in the first direction than the first sub-heater.

20. A fixing device comprising:

a tubular body defining a first direction along a tubular axis;

a heater positioned on an inner side of the tubular body, the heater comprising:

a substrate that supports a heat generating body, the substrate comprising:

a first region positioned along the first direction, a first area being a cross section orthogonal to the first direction, wherein the first area in a first position on an inner side of the first region is smaller than the first area in a second position present on an outer side of the first region; and a heat transfer member in contact with the heater, the heat transfer member comprising:

a second region positioned along the first direction, a second area being a cross section orthogonal to the first direction, wherein the second area in a third position on an inner side of the second region being is larger than the second area in a fourth position present on an outer side of the second region, and wherein at least a part of the second region overlaps at least a portion of the first region along the first direction, wherein, a thickness of the substrate defines a third direction, wherein a first surface of the heater is in contact with the inner surface of the tubular body, and wherein a second surface of the heater is opposite the first surface of the heater in the third direction, and the second surface is in contact with the heat transfer member, wherein a thickness of the heat transfer member in the third direction is greater than the thickness of the substrate in the third direction, and wherein a length of a projection of the heat transfer member is greater than a length of a recess of the substrate in the first direction.

* * * * *